(12) United States Patent
Wan et al.

(10) Patent No.: US 7,551,858 B2
(45) Date of Patent: *Jun. 23, 2009

(54) SIGNAL IDENTIFICATION IN OPTICAL COMMUNICATIONS NETWORKS

(75) Inventors: Ping Wai Wan, Ottawa (CA); Derrick Remedios, Ottawa (CA); Patrick Chilufya Chimfwembe, Ottawa (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 384 days.

This patent is subject to a terminal disclaimer.

(21) Appl. No.: 11/511,248

(22) Filed: Aug. 29, 2006

(65) Prior Publication Data

US 2006/0291870 A1 Dec. 28, 2006

Related U.S. Application Data

(63) Continuation-in-part of application No. 10/263,959, filed on Oct. 4, 2002, now Pat. No. 7,155,122.

(30) Foreign Application Priority Data

Oct. 5, 2001 (CA) .................................... 2358382

(51) Int. Cl.
*H04B 10/04* (2006.01)
*H04B 10/08* (2006.01)
(52) U.S. Cl. .......................... 398/183; 398/198; 398/32
(58) Field of Classification Search ................. 398/183, 398/198, 192, 195, 200, 201, 25, 32, 33, 398/186, 34; 370/307, 464, 465; 375/335, 375/340, 376
See application file for complete search history.

(56) References Cited

U.S. PATENT DOCUMENTS 4,747,095 A 5/1988 Crookshanks (Continued)

FOREIGN PATENT DOCUMENTS

WO 99/33200 7/1999

OTHER PUBLICATIONS

Hill, G.R., et al, "A Transport Network Layer Based on Optical Network Elements", Journal of Lightwave Technology, IEEE, New York, USA, vol. 11, No. 5/6, May 1, 1993, pp. 667-676.

(Continued)

*Primary Examiner*—M. R. Sedighian
(74) *Attorney, Agent, or Firm*—Victoria Donnelly

(57) ABSTRACT

Signals in an optical communications network, such as optical channels in an optical WDM network for example, are each identified by at least two low frequency dither tones with which the signal is modulated. The dither tones alternate with a predetermined periodicity to produce a cyclically repeated sequence of dither tones. A network parameter, such as a channel identifier for example, is obtained by the detection of the particular combination of dither tones in the sequence. To detect a number of network parameters a signal is modulated with a number of cyclically repeated sequences of dither tones each uniquely identifying a respective network parameter. In some implementations each dither tone in a cyclically repeated sequence of dither tones is repeated with substantially the same phase and coherent averaging is performed over a number of periods to detect dither tones on low power signals.

27 Claims, 6 Drawing Sheets

U.S. PATENT DOCUMENTS

| | | | |
|---|---|---|---|
| 5,216,417 | A | 6/1993 | Honda |
| 5,513,029 | A | 4/1996 | Roberts |
| 5,745,274 | A * | 4/1998 | Fatehi et al. ............... 398/198 |
| 5,959,749 | A | 9/1999 | Danagher |
| 5,974,094 | A | 10/1999 | Fines |
| 6,078,412 | A | 6/2000 | Fuse |
| 6,101,012 | A | 8/2000 | Danagher |
| 7,158,723 | B2 * | 1/2007 | Wan et al. ..................... 398/32 |
| 2003/0002118 | A1 * | 1/2003 | Givehchi .................... 359/181 |
| 2003/0067646 | A1 | 4/2003 | Wan |
| 2003/0067647 | A1 | 4/2003 | Wan |
| 2003/0067651 | A1 | 4/2003 | Wan |
| 2004/0062548 | A1 | 4/2004 | Obeda |
| 2004/0062549 | A1 | 4/2004 | Obeda |

OTHER PUBLICATIONS

Richard G. Lyons, "Understanding Digital Signal Processing", published by Addison-Wesley Publishing Company, Copyright 1997, pp. 319-349.

Fred Heisman et al, "Signal Tracking and Performance Monitoring in Multi-Wavelength Optical Networks", WeB 2.2, 22.sup.nd European Conference on Optical Communication-ECOC'96, Oslo, pp. 3.47-3.50.

* cited by examiner fs - Switching frequency

SIGNAL IDENTIFICATION IN OPTICAL COMMUNICATIONS NETWORKS

RELATED APPLICATION

This application is a Continuation-In-Part of U.S. patent application Ser. No. 10/263,959 to Wan et al, entitled "Channel Identification in Communications Networks" filed Oct. 4, 2002, now U.S. Pat. No. 7,155,122 and claims benefit from U.S. patent application Ser. No. 10/067,748 filed on 8 Feb. 2002; U.S. patent application Ser. No. 09/972,991 to Wan et al, filed on 10 Oct. 2001; and from Canadian Application Serial No. 2,358,382 to Wan et al, filed on 5 Oct. 2001.

FIELD OF THE INVENTION

This invention relates to channel identification in communications networks or systems. The invention is generally applicable to communications networks or systems using any type of communications media, such as optical, wireless, or wired communications systems, but is particularly applicable to, and is described below in the context of, optical WDM (wavelength division multiplex) communications networks or systems.

BACKGROUND

In optical WDM communications networks or systems it has been proposed to identify each of a plurality of optical signals or channels, each at an individual optical wavelength, with a respective relatively low frequency dither tone with which the intensity or amplitude of the respective optical signal is modulated. For example, in a WDM network in which optical signals are each modulated with data at a high bit rate, for example 2.5 Gb/s or more, each optical signal may also be modulated with a respective dither tone in a relatively low frequency range, for example about 10 kHz to about 100 kHz or more. The dither tone modulation can be provided with a specific modulation depth, thereby not only providing channel identification but also power level information for the optical signal, thereby to facilitate functions such as performance monitoring and fault management in the network.

Examples of such proposals are disclosed in Hill et al., "A Transport Network Layer Based On Optical Network Elements", IEEE Journal of Lightwave Technology, Volume 11, No. 5/6, pages 667-679, May/June 1993, and in Roberts U.S. Pat. No. 5,513,029, issued Apr. 30, 1996 and entitled "Method And Apparatus For Monitoring Performance Of Optical Transmission Systems".

Heismann et al., "Signal Tracking And Performance Monitoring In Multi-Wavelength Optical Networks", 22nd European Conference on Optical Communication—ECOC'96, pages 3.47 to 3.50, 1996 also discloses such a proposal in which a pilot tone which acts like a dither tone can further be modulated using frequency-shift keying (FSK) with an additional digital signal providing digital information, such as optical routing information. For example, this article discloses FSK modulation of tones at 10 kHz and 12 kHz each with ±500 Hz frequency excursions in accordance with respective 100 b/s digital signals.

While such proposals provide the advantage that optical channels can be identified and their power levels monitored without detection and demodulation of the optical channel itself and without serious adverse effects on the optical channels, they fail to meet increasing requirements of WDM networks in several respects.

More particularly, such proposals provide a limited number of distinguishable dither tones, each of which identifies a respective optical channel so that the WDM network can have only a similarly limited number of optical channels. In addition, detection of such tones can be very difficult. For example, an optical fiber in a WDM network may carry up to 32 optical channels within a wide optical dynamic range of for example 30 dB (a dynamic range of 60 dB for the corresponding electrical signals) or more. Detection of a dither tone for an optical channel at the lower end of this dynamic range is very difficult in the presence of possibly many other optical channels higher in this dynamic range, because the latter constitute noise for the detection process.

Further, dither tone detection can be complicated by the presence of other interference, such as interference tones that occur with a frequency spacing of about 8 kHz in the case of SONET (synchronous optical network) communications. Furthermore, many optical networks carry non-SONET (non-Synchronous Optical Network) signals, such as Gigabit Ethernet and proprietary signals that have interference tones with unknown or changing frequencies. Such tones can cause interference and this also complicates dither tone detection.

A need therefore exists for an improved method of and apparatus for channel identification which can facilitate robust detection of dither tones for identification of larger numbers of channels in a communications network, in particular an optical WDM network.

SUMMARY OF THE INVENTION

According to one aspect of this invention there is provided a signal identification method in an optical communications network. The method involves modulating an optical signal with a cyclically repeated sequence of low frequency dither tones having a predetermined periodicity. The method involves performing a sequence of frequency analysis operations on the optical signal to produce respective frequency analysis results. The method also involves detecting the low frequency dither tones using the respective frequency analysis results produced by the frequency analysis operations.

In some embodiments of the invention a network parameter is identified using the detected low frequency dither tones.

In some embodiments of the invention the cyclically repeated sequence of low frequency dither tones includes at least one set of low frequency dither tones modulated simultaneously. In such embodiments, the method involves identifying a network parameter by detecting at least one of the low frequency dither tones from each set. This provides a robust mechanism for detecting network parameters when some of the dither tones cannot be detected.

In some embodiments of the invention the optical signal is modulated with at least one other cyclically repeated sequence of low frequency dither tones having a respective predetermined periodicity. In such embodiments the method involves: for each cyclically repeated sequence of low frequency dither tones, detecting the low frequency dither tones using the respective frequency analysis results produced by the frequency analysis operations, and identifying a respective network parameter from the detected low frequency dither tones.

In some embodiments of the invention each cyclically repeated sequence of low frequency dither tones uniquely identifies its respective network parameter.

In some embodiments of the invention each network parameter is one of a channel ID (IDentifier), a link ID, an optical fiber ID, a fiber section ID, an optical band ID, a source node ID, a destination node ID, and a bundle ID.

In some embodiments of the invention the cyclically repeated sequences of low frequency dither tones are modulated in one of the following ways: (a) simultaneously; (b) consecutively; and (c) using a combination of (a) and (b).

In some embodiments of the invention each low frequency dither tone in the cyclically repeated sequence of low frequency dither tones is repeated with substantially the same phase at the predetermined periodicity. In such embodiments the method involves performing coherent averaging of the frequency analysis results over a plurality of frequency analysis operations to detect the low frequency dither tones.

According to another aspect of this invention there is provided a method of modulating an optical signal in an optical communications network. The method involves modulating the optical signal with a cyclically repeated sequence of low frequency dither tones having a predetermined periodicity.

In some embodiments of the invention the optical signal is modulated with at least one other cyclically repeated sequence of low frequency dither tones having a predetermined periodicity. This allows a number of the above network parameters to be identified by the detection of the sequences.

In some embodiments of the invention at least one of the low frequency dither tones is modulated at least twice within the sequence.

In some embodiments of the invention the cyclically repeated sequence of low frequency dither tones comprises a plurality of sets of at least one low frequency dither tone. At least two of the plurality of sets have a different number of low frequency dither tones.

According to another aspect of this invention there is provided a detection arrangement for an optical communications network. The arrangement has a detector for detecting an optical signal modulated with a cyclically repeated sequence of low frequency dither tones having a predetermined periodicity. The detector also has a processor for performing a sequence of frequency analysis operations on the optical signal to produce respective frequency analysis results and for detecting the dither tones using the respective frequency analysis results produced by the frequency analysis operation.

According to another aspect of this invention there is provided a modulating arrangement for modulating an optical signal. The arrangement has means for producing a cyclically repeated sequence of low frequency dither tones having a predetermined periodicity. The arrangement also has a modulator for modulating the optical signal with the cyclically repeated sequence of low frequency dither tones.

In some embodiments of the invention the arrangement also has means for producing at least one other cyclically repeated sequence of low frequency dither tones having a predetermined periodicity. In such embodiments the modulator also has means for modulating the optical signal with the other cyclically repeated sequences of low frequency dither tones.

In some embodiments of the invention the arrangement has at least one programmable frequency source for generating the low frequency dither tones.

In some embodiments of the invention the arrangement has at least two programmable frequency sources for generating the low frequency dither tones and at least one selector for alternately selecting the low frequency dither tones.

In some embodiments of the invention the arrangement has a DAC (Digital to Analog Converter) for generating the low frequency dither tones.

According to another aspect of this invention there is provided an optical system having a modulating arrangement for generating a cyclically repeated sequence of low frequency dither tones having a predetermined periodicity and for modulating an optical signal with the cyclically repeated sequence of dither tones. The system also has a detection arrangement for: (a) detecting the signal; (b) performing a sequence of frequency analysis operations on the optical signal to produce respective frequency analysis results; and (c) detecting the low frequency dither tones using the respective frequency analysis results produced by the frequency analysis operation.

In some embodiments of the invention the system has a global clock for synchronizing time intervals for modulating the signal with the dither tones at the modulating arrangement and time intervals for detection of the low frequency dither signal at the detection arrangement.

BRIEF DESCRIPTION OF THE DRAWINGS

The invention will be further understood from the following description by way of example with reference to the accompanying drawings, in which.

DETAILED DESCRIPTION

Figure 1:
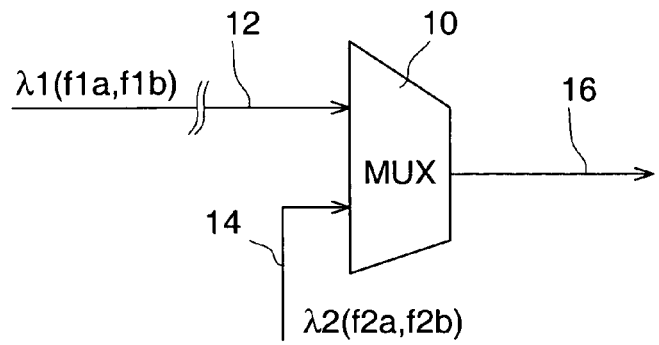
FIG. 1 illustrates an optical multiplexer arrangement with reference to which a problem addressed by an embodiment of the invention is explained.

As indicated initially above, embodiments of the invention are described below in the context of an optical WDM network, but the invention is also generally applicable to, and the described embodiments of the invention may be adapted for operation in, other types of communications network.

As described above, one disadvantage of known channel identification proposals is that each optical channel is identified by a respective dither tone, and there is a limited number of dither tone frequencies and hence a similarly limited number of optical channels in the WDM network. While this number can be increased by increasing a frequency range over which the dither tones extend and/or by decreasing a frequency spacing of the dither tones within this range, such steps involve other disadvantages, such as an increased potential for interference with data signals and/or increased difficulty in distinguishing the dither tones from one another.

In embodiments of this invention, this disadvantage is greatly reduced or eliminated by using a combination of two or more low frequency dither tones for identification of each optical channel. For example, an optical WDM network may provide 1600 dither tones in a frequency range from about 48 kHz to about 64 kHz with a constant separation or frequency spacing of 10 Hz between adjacent dither tones. A combination of, for example, two such tones is used to identify each optical channel, so that the number of channels which can be identified is increased, from 1600 using one such tone to identify each channel as in the known proposals, to the order of 2.5 million. It is to be clearly understood that other ranges of frequencies can be used for the low frequency dither tone. For example, in some implementations the frequencies are in the kHz range and/or the MHz range.

A combination of a greater number of dither tones, for example three or more, can alternatively be used to identify individually an even greater number of optical channels, so that the WDM network can have a virtually unlimited number of individually identifiable optical channels. Similarly, a combination of a greater number of dither tones can be used in a redundant manner to increase reliability or robustness of the channel identification, even in the case of low optical power levels and in the presence of interference. For example, each optical channel can be identified by a respective combination of three dither tones, the channel being detected by detection of at least any two of the three dither tones.

For simplicity in the following description it is assumed that each optical channel is identified by a respective combination of two dither tones. The nature of the combination of the dither tones is discussed further below.

Also, in order to increase the robustness of the channel identification in the presence of interference, some constraints may be placed on the particular selections of dither tones used to identify each optical channel. For example, with SONET interference tones occurring with a frequency spacing of about 8 kHz as described above, the dither tones selected for each channel identification may be selected to avoid spacings of about 8 kHz between them, so that at worst only one of the two (or more) dither tones is subject to these interference tones. Furthermore, some optical networks carry non-SONET signals, such as Gigabit Ethernet and proprietary signals that have interference tones with unknown or changing frequencies. In such networks the multiple tones are used for detecting a signal and overcome interference effects. As will be discussed in further details below, in such networks M dither tones are assigned to a channel, where M is an integer satisfying M≧2. In some embodiments of the invention, a channel is identified when one or more of the M dither tones are detected.

The combination of the dither tones for each channel identification is preferably an alternation of the two dither tones (or a cyclic repetition for a sequence of more than two dither tones), each dither tone being modulated onto the respective optical channel in turn for a predetermined period as further described below. Thus the dither tones are alternately (or cyclically) switched to modulate and thereby identify the respective optical channel.

Although such switching of the dither tones is preferred as discussed further below, other ways of combining the dither tones are possible. For example, the dither tones for identifying each channel may be summed and the respective optical channel modulated with the resulting summed signal. However, this is not preferred because this composite modulation undesirably produces greater closure of the "eye" for detection of the high speed data signal carried by the optical channel. Such eye closure is further increased using a sum of more than two dither tones for each channel identification.

It can be appreciated that, as in the FSK modulation of a single tone channel identifier as described in the article by Heismann et al. referred to above, the two or more dither tones used for channel identification as described here can be further extended for additionally carrying low speed data in various ways.

As discussed above, a significant difficulty with known proposals for channel identification using dither tones arises from a wide dynamic range of optical signals which can occur in an optical WDM network. This is further described below by way of a very simple example represented by FIGS. 1 and 2.

Referring to FIG. 1, an optical multiplexer 10 is illustrated as being supplied with two optical signals on optical paths 12 and 14, and producing a multiplexed optical signal on an optical path 16. The optical signal on the path 12 is assumed to comprise an optical channel having a wavelength $\lambda 1$, this channel being identified by two alternating dither tones f1a and f1b in the manner described above. The optical signal on the path 14 is assumed to comprise an optical channel having a wavelength $\lambda 2$, this channel being identified by two alternating dither tones f2a and f2b also in the manner described above.

Figure 2:
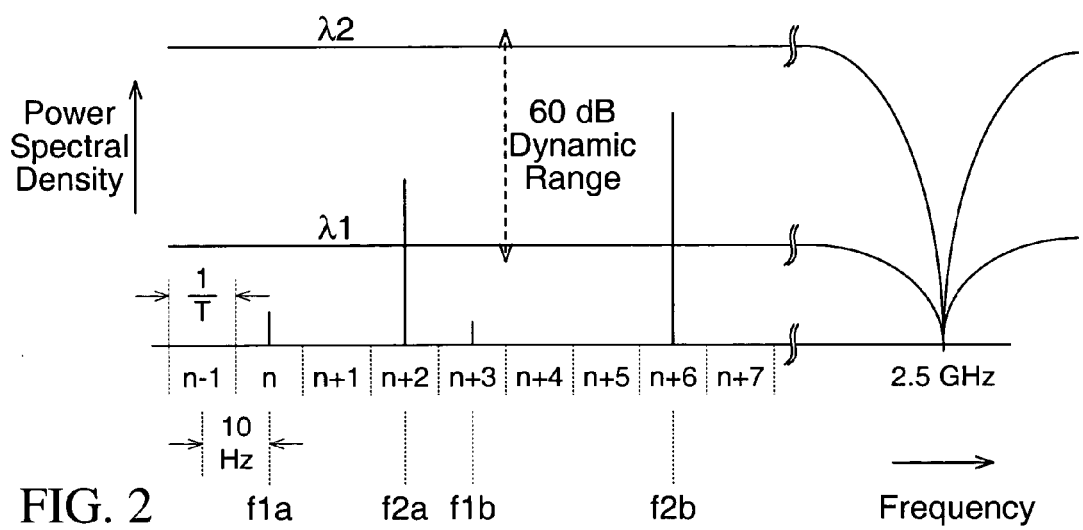
FIG. 2 diagrammatically illustrates possible power spectral densities of signals of the arrangement of FIG. 1.

FIG. 2 represents part of a graph of power spectral density (PSD) versus frequency, for signals of the optical channels at the wavelengths $\lambda 1$ and $\lambda 2$; FIG. 2 in particular illustrates a small part of the frequency range which includes the dither tones f1a, f1b, f2a, and f2b which are assumed for convenience of illustration to be close together. As dither tone detection is typically performed using an FFT (Fast Fourier Transform) process which produces total energy or power results for respective frequency bins or adjacent frequency ranges, the frequency axis in FIG. 2 is labelled to show such frequency bins numbered n−1 to n+7 where n is an integer. For example, FIG. 2 illustrates these frequency bins as being centered at frequencies 10 Hz apart, corresponding to a constant frequency spacing of adjacent dither tones of 10 Hz as stated above by way of example, the FFT process or operation being performed over a period T which is the inverse of the frequency bin periodicity, so that in this case (1/T)=10 Hz.

As illustrated in FIG. 2, the dither tones f1a and f1b are at the centres of the frequency bins n and n+3 respectively, and the dither tones f2a and f2b are at the centres of the frequency bins n+2 and n+6 respectively.

The high speed data carried by the optical channels is typically NRZ (non-return to zero) data having a sinc ((sin x)/x) frequency characteristic, for which the PSDs of the signals for the optical channels having the wavelengths $\lambda 1$ and $\lambda 2$ are also illustrated in FIG. 2. The optical signals can have relative optical powers which may be anywhere within a wide dynamic range, typically a range of about 30 dB or more, corresponding to (electrical) PSDs within a range of about 60 dB or more as represented in FIG. 2 by a vertical dashed line. Within the respective frequency bins of the FFT process, the high speed data signal components of the optical channels constitute noise which detracts from the dither tone detection.

By way of example, it is assumed that the optical channel at the wavelength $\lambda 1$ has a relative optical power near the low end of the dynamic range (for example this optical channel may have traversed a large number of attenuating optical components), and that the optical channel at the wavelength λ2 has a relative optical power near the high end of the dynamic range (for example it may have been supplied from a local modulated laser source). Over the range of the frequency bins the corresponding high speed data PSDs of these channels are substantially constant and are represented by horizontal lines labelled λ1 and λ2 respectively in FIG. 2.

In comparison, the PSDs of the dither tones f1*a* and f1*b* for the relatively weak optical channel at the wavelength λ1 are very small, as shown in FIG. 2, so that these dither tones can be very difficult to detect. It is observed that, as shown in FIG. 2, the PSDs of the dither tones f1*a* and f1*b* for the optical channel at the wavelength λ1, and likewise the greater PSDs of the dither tones f2*a* and f2*b* for the optical channel at the wavelength λ2, are not generally equal. This is because in the embodiments described above there is no synchronization between the alternating periods for which the dither tones modulate the respective optical channels, so that each dither tone of each channel can be present during an arbitrary part of the FFT period T.

It can be appreciated that the difficult problem of detecting the dither tones, e.g. f1*a* and f1*b*, of a weak optical channel is exacerbated in the event, as may be typical, that the optical path 16 carries multiple optical channels with high relative optical powers. For example, in an optical WDM network each such optical path may carry up to 32 optical channels.

One way in which this problem can potentially be reduced is to decrease the width of each frequency bin in the FFT process, thereby reducing the noise component within each frequency bin due to the optical channels. This corresponds to an increase in the period T of the FFT process and the number of frequency bins within a given frequency range, thereby considerably increasing computational and memory requirements for the FFT process, and also increasing a delay for detection of the dither tones. For the wide dynamic range indicated above, the period T may need to be of the order of 100 seconds, and these requirements and the corresponding delay are increased to such an extent that this approach becomes impractical.

It can be appreciated that this also necessitates a very precise generation of each dither tone. For example, a period T of 100 seconds corresponds to a frequency bin width of 0.01 Hz, requiring a substantially better precision than this for generation of each dither tone.

Although these difficulties are very significant for the extreme condition of optical signals being at opposite ends of the wide dynamic range as illustrated in FIG. 2, it can be realised that in most situations such extreme conditions will not apply. For optical signals all of which are within a smaller dynamic range of for example about 20 dB, it can be practical to detect the dither tones for all of the optical channels using an FFT process with a period T of for example 1 second and frequency bins of width 1 Hz, considerably reducing the FFT computational and memory requirements and the detection delay in such more usual conditions.

In view of these considerations, in an embodiment of the invention as described below an FFT process is used with a period T, for example 1 second, which is sufficiently short to be practical in terms of computation, memory, and delay requirements and which in many cases of optical channels having typical optical power levels is sufficient to permit their dither tones to be detected within this FFT period, i.e. in a single FFT operation. This FFT process is supplemented by coherent averaging of the FFT results over longer periods, i.e. over a plurality, possibly many, FFT operations, enabling dither tones of channels at lower relative powers also to be detected even where different ones of the optical channels have powers at both extremes of the dynamic range, extending over the maximum optical dynamic range of for example 30 dB.

To permit this coherent averaging, the dither tones are continuously generated, and the alternating switching between the two dither tones identifying each optical channel has precisely controlled periods, so that a dither tone detector can determine precisely a phase relationship between successive bursts of each dither tone, as further described below. In addition, the dither tones are generated with a desired accuracy, conveniently all being derived from a single, high frequency, stable oscillator.

Figure 3:
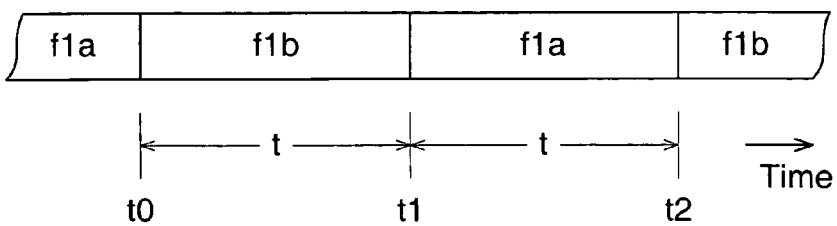
FIG. 3 illustrates successive bursts of dither tones providing a channel identification.

By way of example, it is assumed that a duration t of a dither tone switched alternately for modulation and hence identification of a respective optical channel is the same for all dither tones and for all optical channels. Conveniently, this duration t may be of the order of 1 second. FIG. 3 illustrates consequent successive bursts of the dither tones f1*a* and f1*b* which are used for modulation and identification of the optical channel having the wavelength λ1 as described above.

Referring to FIG. 3, the respective optical channel having the wavelength λ1 is modulated alternately as described above with the dither tones f1*a* and f1*b*. At a switching time t0, there is a switch of the modulating dither tone from f1*a* to f1*b*. Subsequently, at a switching time t1 there is a switch of the modulating dither tone from f1*b* back to f1*a*, at a switching time t2 there is a switch of the modulating dither tone from f1*a* back to f1*b*, and so on. Each dither tone burst has a duration t, i.e. the switching times t0, t1, t2, and so on occur periodically with the time spacing t.

Although there may be a phase discontinuity between the modulating dither tones at the respective switching times, the facts that these switching times occur with the periodicity t and each dither tone is produced continuously mean that there is a precisely determinable phase relationship between successive bursts of each dither tone. Thus there is a phase difference of $2\pi tf$ between the end of each burst of a dither tone and the start of the next burst of the same dither tone after an interval t, where f is the frequency of the respective dither tone. Thus for the dither tone f1*a* this phase difference, between the switching times t0 and t1, is $2\pi t(f1a)$, and for the dither tone f1*b* this phase difference, between the switching times t1 and t2, is $2\pi t(f1b)$.

Knowing the periodicity t, each dither tone detector can accordingly determine this phase difference for each dither tone, and use the determined phase difference for coherent averaging of the FFT results for the respective dither tone over a plurality, possibly a large number, of FFT processing periods or FFT operations. The noise energy due to the optical signals over such periods is not similarly coherent, so that the coherent averaging, which is an accumulation of FFT results for each respective frequency bin in accordance with amplitude and phase over time, enhances the detection of the respective dither tone relative to this noise.

More particularly, for detecting each dither tone, each FFT operation produces a phase and amplitude result (for example represented by a complex number) for the respective frequency bin. For coherent averaging over successive FFT operations, a current result or average can be phase shifted in accordance with the phase difference between successive bursts of this dither tone as discussed above, and the result for the next FFT operation for the same frequency bin added in accordance with its phase and amplitude (i.e. a vector addition). This accumulation can be carried out in accordance with any desired averaging process, for example using windowing or weighting of the FFT results. Over a desired averaging period, this coherent averaging distinguishes between a dither tone of a weak optical channel and noise.

Although an FFT is referred to above and is preferred because it enables phase and amplitude results to be produced for all of the dither tone frequencies for each FFT period T, it can be appreciated that other forms of frequency analysis may be used to produce phase and amplitude results for the respective dither tone frequencies, either individually for different frequency analysis operation periods (for example, using a Discrete Fourier Transform process) or collectively within a single period.

Figure 4A:
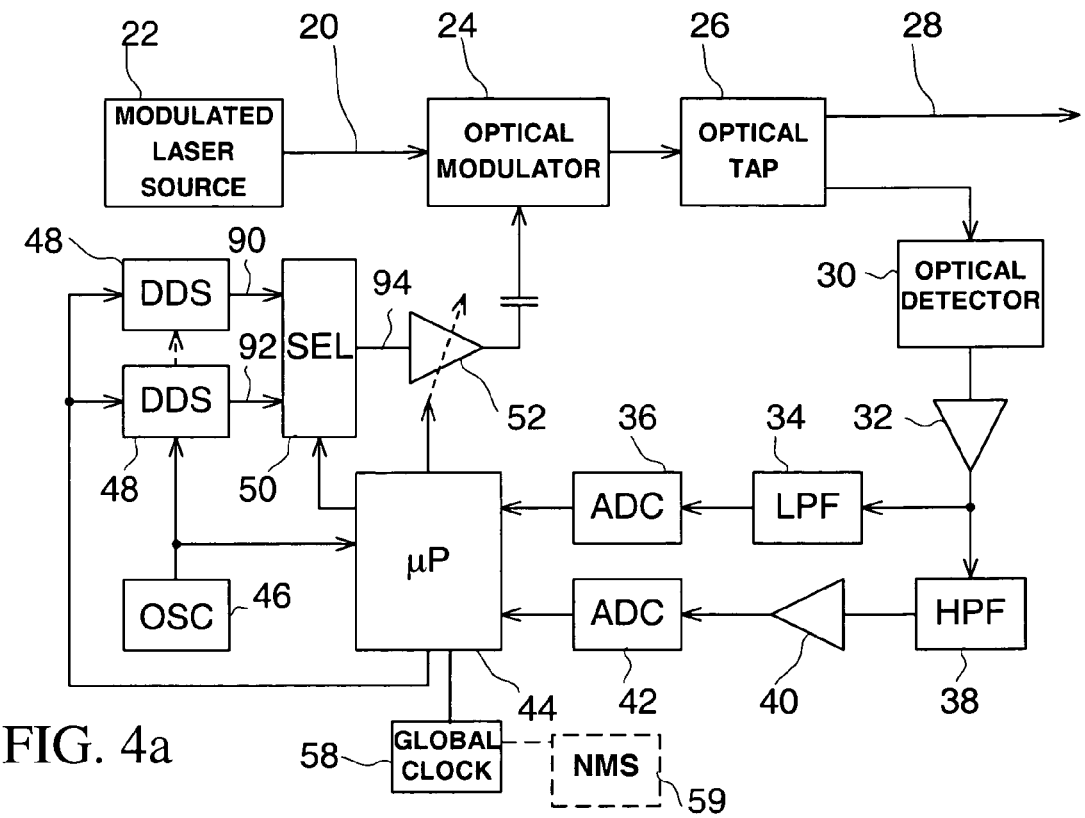
FIG. 4a illustrates one form of dither tone generator and modulating arrangement in accordance with an embodiment of the invention.

FIG. 4a illustrates one form of dither tone generator and modulating arrangement, which can be used in an embodiment of the invention. Referring to FIG. 4a, an optical channel is provided on an optical fiber or path 20 from a modulated laser source 22, and is supplied via an optical modulator 24 and an optical tap 26 to an ongoing optical path 28. The source 22 provides the optical channel at a desired optical wavelength and modulated with data to be carried by the optical channel, typically at a high bit rate of for example 2.5 Gb/s. The data modulation can alternatively be carried out separately from the source 22, for example on the optical path 20, or using the optical modulator 24, or on the optical path 28 after the optical tap 26, the optical modulator 24 in the latter case modulating an optical carrier for the optical channel. In any event, the optical modulator 24 provides intensity modulation of the optical channel for channel identification as described below.

The optical tap 26 supplies a small portion, e.g. 5%, of the optical output of the modulator 24 to an optical detector 30, whose electrical output is amplified by an AGC (automatic gain controlled) amplifier 32. An output of the amplifier 32 is supplied via a low pass filter (LPF) 34 to an analog-to-digital converter (ADC) 36, and via a band pass or high pass filter (HPF) 38 and an amplifier 40 to an ADC 42. The ADCs 36 and 42 produce digital signals, which are supplied to a digital signal processor or microprocessor (μP) 44.

An oscillator 46 provides a stable source of a signal, for example at a frequency of 50 MHz, which is supplied to the microprocessor 44 and to each of a plurality of direct digital synthesizers (DDSs) or other programmable frequency sources 48. Each DDS 48 is arranged to produce, under programmed control of the microprocessor 44, a respective one of the dither tones on a respective input to a selector 50. An output of the selector 50 is coupled via a controlled gain amplifier 52 and a capacitive coupling to a control input of the optical modulator 24. The selector 50 and the gain of the amplifier 52 are controlled by the microprocessor 44.

In operation, each DDS 48 is arranged to produce continuously a respective one of the dither tones to be used for identification of the respective optical channel; for example the dither tones f1a and f1b for the optical channel λ1 as described above can be produced each by a respective one of two DDSs 48 at the source of this optical channel. The selector 50 is controlled by the microprocessor 44 to alternately select these dither tones with the periodicity t as described above, whereby these tones are modulated onto the optical channel by the optical modulator 24. In the case of more than two dither tones used for channel identification, there is a correspondingly increased number of DDSs 48 and selector inputs, and the selector 50 is controlled by the microprocessor 44 to select the respective dither tones in a cyclically repeated periodic sequence.

The LPF 34 and ADC 36 provide a DC feedback path to the microprocessor 44, and the HPF 34, amplifier 40, and ADC 42 provide a feedback path to the microprocessor 44 for the frequency band of the dither tones, in accordance with which the microprocessor 44 controls the gain of the amplifier 52 to maintain a desired constant depth of modulation by the optical modulator 24. For example, the modulation depth may be about 4%. The use of a constant modulation depth for channel identification facilitates determining optical power levels in the WDM network in known manner.

Although FIG. 4a represents an arrangement for only one optical channel, it can be appreciated that the same arrangement can be provided for each optical channel, and that parts of these respective arrangements may be common for multiple optical channels. For example, it can be appreciated that the ADCs 36 and 42 and the microprocessor 44 can be multiplexed for operation for a plurality of optical channels, the oscillator 46 can be used in common for all of the optical channels, and only as many DDSs 48 are required as the number of dither tones used for identifying the respective optical channels.

In this respect, it is observed that a particularly convenient arrangement can be provided by providing all of the components of FIG. 4a, except the modulated laser source 22, for each of a plurality of optical channels which are initially multiplexed by an optical multiplexer (similar to the multiplexer 10 of FIG. 1) at the inputs of this multiplexer.

This facilitates implementation of the arrangement of FIG. 4a with the multiplexed operation as described above for the plurality of optical channels, while enabling the optical channels to be supplied from arbitrary modulated laser sources such as the source 22. More generally, it can be appreciated that the dither tones can be applied to any optical channel anywhere between its source and its multiplexing with one or more other optical channels.

Figure 5:
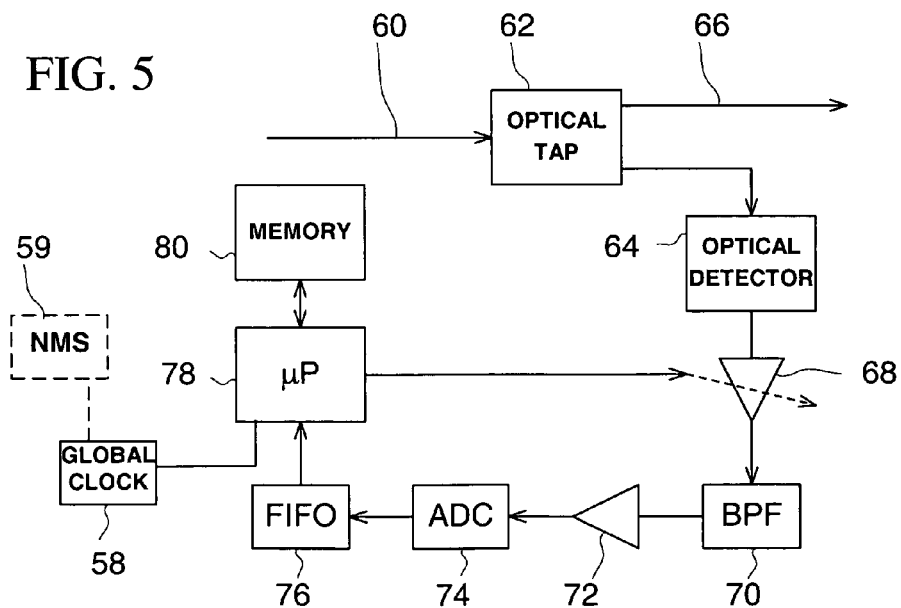
FIG. 5 illustrates one form of detection arrangement in accordance with an embodiment of the invention.

FIG. 5 illustrates a corresponding dither tone detection arrangement, which may be used at any desired point in the optical WDM network for identifying an optical channel on an optical fiber or path 60 by detecting the dither tones.

Referring to FIG. 5, an optical tap 62 supplies a small portion, e.g. 5%, of an optical signal on the path 60 to an optical detector 64, and supplies most of the optical signal power to an ongoing optical path 66. An electrical output of the optical detector 64 is amplified by a controlled gain amplifier 68, an output of which is supplied via a band pass filter (BPF) 70 and an amplifier 72 to an ADC 74. The BPF 70 has a pass band including the dither tone frequency range. The ADC 74 produces a digital signal which represents detected dither tones and is supplied via a FIFO (first-in, first-out store) 76 to a digital signal processor or microprocessor 78. The microprocessor 78, which has an associated memory 80, controls the gain of the amplifier 68 in accordance with the power of the optical signal on the path 60.

The microprocessor 78 operates in a known manner to perform FFT processing of the digital signals provided by the ADC 74, using the memory 80 for this FFT processing, in respective FFT periods T to detect any dither tone modulation of the optical signal on the optical path 60, with the FIFO 76 ensuring that data is not lost during FFT processing by the microprocessor 78. As discussed above, this determines the respective dither tones, and hence the optical channel identification, in one FFT operation in many instances of typical optical signal power levels. For ensuring detection of dither tones for relatively low power optical channels even in the presence of one or more relatively high power optical channels on the path 60, without increasing the FFT period T, coherent averaging of the FFT results is carried out over a plurality, possibly a large number, of successive FFT periods T as described above.

As indicated above, there is no requirement for synchronization between, for example, the operation of the selector 50 in the dither tone generation arrangement of FIG. 4 and the FFT periods of the microprocessor 78 in the detection arrangement of FIG. 5. The continuous generation of each dither tone ensures that, regardless of the particular timing of the selection of this dither tone by a selector such as the selector 50, and regardless of the particular relative timing of the FFT periods T used in a detection arrangement, the coherent averaging over a plurality of such FFT periods will gradually result in accumulated results properly representing any dither tones which are present. As indicated above, such coherent averaging comprises an accumulation of the FFT frequency bin results, or amplitudes in accordance with their respective phase differences for successive FFT periods, these phase differences being determined by the microprocessor 78 of the detection arrangement from the dither tone frequencies and the known period "t".

As indicated above, it is conceivable to replace the alternating dither tones, as described above for identification of each optical channel, by some other combination, such as a summation, of these dither tones, for example by replacing the selector 50 of FIG. 4a by a signal combiner or summer. However, as also indicated above, this is not preferred because it results in relatively increased modulation depth of each optical channel, with corresponding eye closure for detection of the high speed data signal carried by the optical channel.

Figure 6A:
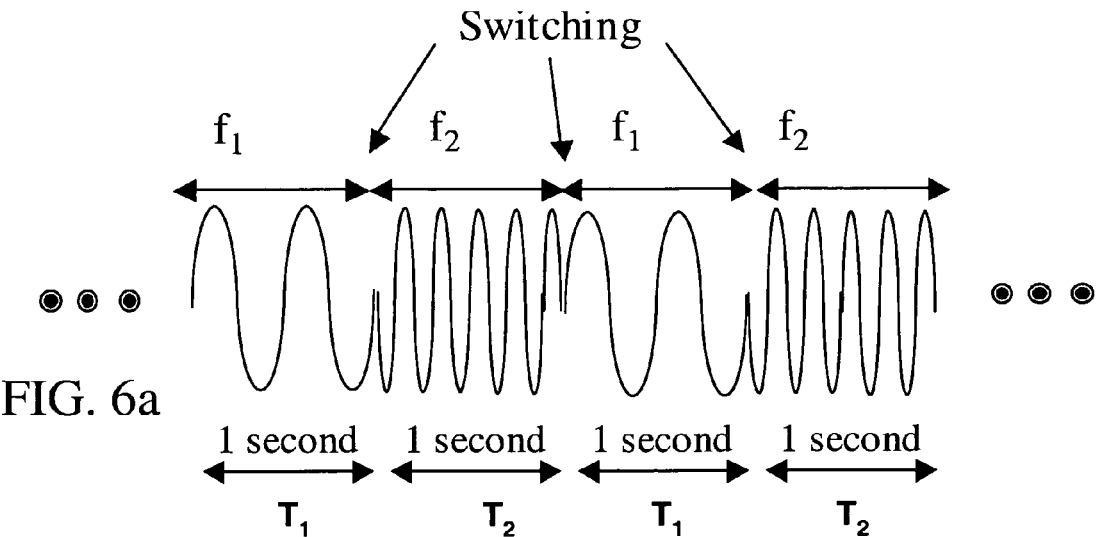
FIG. 6a illustrates synchronized alternating of dither tones in a network.

In another embodiment of the invention, an additional feature of synchronizing switching of dither tones respectively generated and processed by encoding and decoding arrangements at all nodes in a network is provided, i.e. all encoding/decoding arrangements are using the same clock (e.g. global clock), and all of them provide switching/alternating of dither tones at the same time and during same time interval. It means that the steps of modulating and detecting the respective dither tones are synchronized so that time intervals of modulating and detecting the respective dither tone have same duration and start at the instant of switching dither tone frequencies. This situation is illustrated for two alternating tones f1 and f2 in FIG. 6a, and a global clock 58 is shown in dashed line in FIGS. 4 and 5. To have global timing in the network, it is possible to run, e.g., a Network Time Protocol (NTP) on a controlled network. Then a network manager block 59 running the network management software (NMS) sends the global/network timing information to the global clock 58 at each node. Respective synchronization signals are then sent to the microprocessors 44 and 78 at the encoding and decoding arrangements to synchronize both encoding and decoding processes in the network.

Figure 6B:
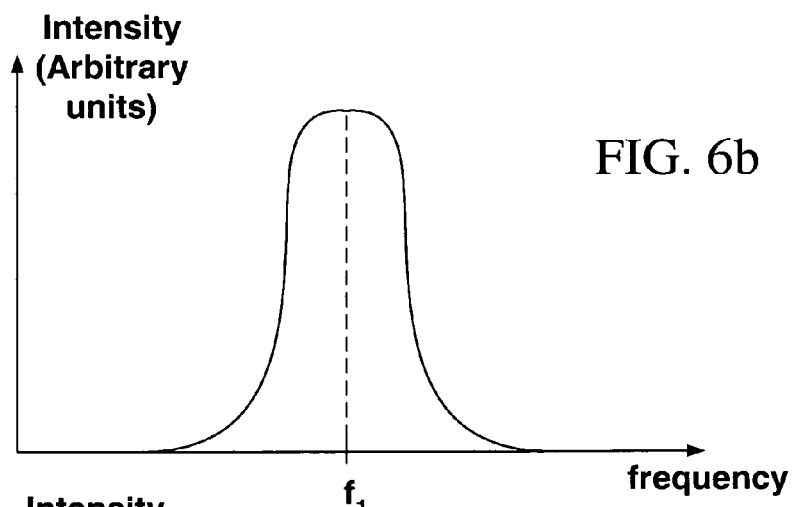
FIG. 6b illustrates an FFT spectrum for synchronized switching of dither tones in a network.
Figure 6C:
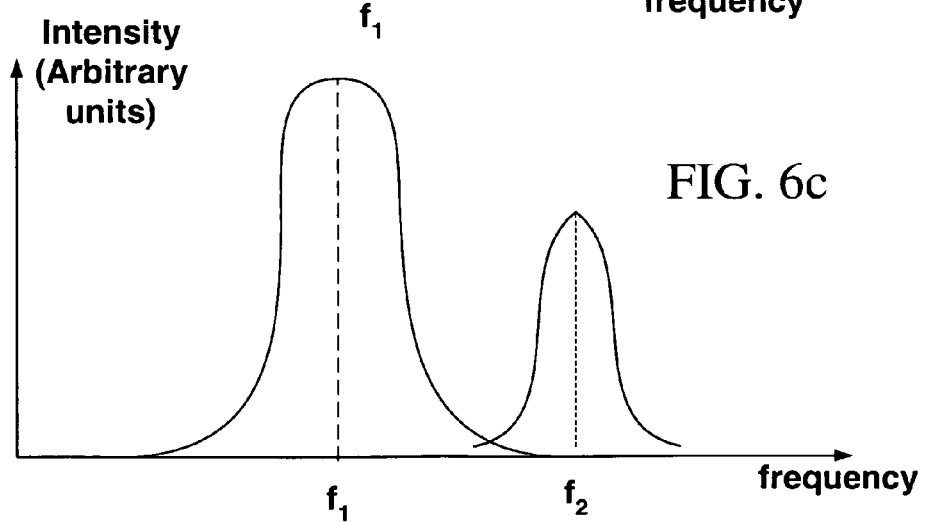
FIG. 6c illustrates an FFT spectrum for unsynchronized switching of dither tones in a network.

Such an encoding/decoding scheme using global synchronization has the following advantages. It allows to detect dither tones easier and with higher signal to noise ratio (about 3 dB higher) as only one of the alternating dither tones appears in an FFT spectrum at a time (FIG. 6b) instead of two tones in unsynchronized schemes (FIG. 6c). Because there is no frequency change in an FFT spectrum at a time, leakage/interference between the two (or more) dither tones is mitigated. It means that spectral range available for the assignment of dither tones can accommodate more tones that will not interfere with each other. As a result, more dither tone frequencies are available for assignment to optical signals, and the whole spectral range is used more efficiently.

Figure 7:
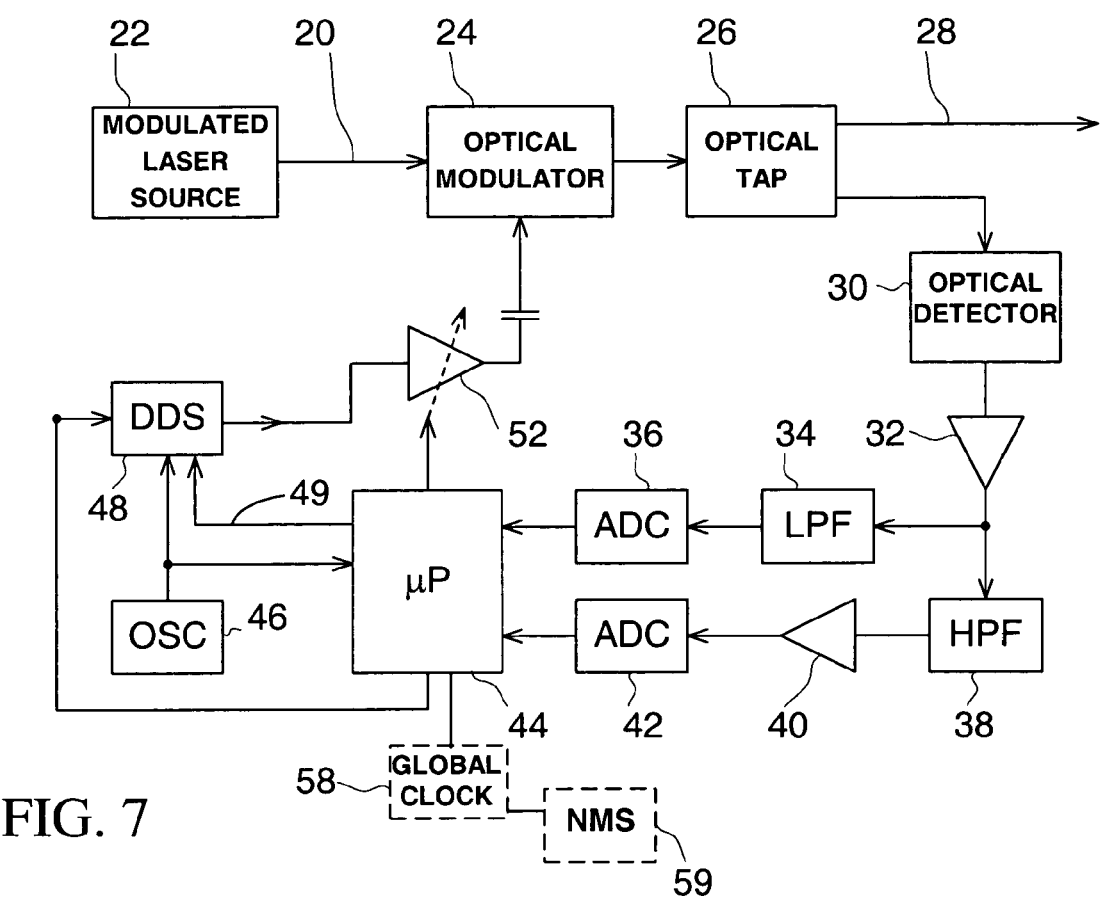
FIG. 7 illustrates the dither tone generator and modulating arrangement in accordance with a modification to the embodiments of the invention.

In yet another modification to the embodiments of the invention, the encoding of dither tones onto the optical channel can be made by a dither tone generator and modulating arrangement which uses one DDS only. Such an arrangement is illustrated by FIG. 7. It is similar to the arrangement of FIG. 4a except for the selector 50 and one of the two DDSs 48 being removed from the arrangement (retaining only one DDS), and a switching control 49 from the μP 44 going directly to the retained DDS 48 (instead of going to the selector 50 in FIG. 4a). The rest of the dither tone generator and modulating arrangement is identical to that shown in FIG. 4a, where the same elements are designated by the same reference numerals on both FIGS. 4a and 7.

In the modulating arrangement of FIG. 7 the DDS 48 is directly controlled by the μP 44, i.e., it is controlled when to switch between selected dither tones. By having just one DDS 48, the phase continuity between the two dither tones of different frequencies is provided opposed to the arrangement of two DDSs which had a shift (jump) in phases between their respective tones. It is known that sudden phase shift may result in unwanted high frequency noise (leakage) at DSP and broadening of the dither tones themselves. Thus, by using just one DDS 48 and providing phase continuity of dither tones, this problem is reduced or eliminated.

Figure 8:
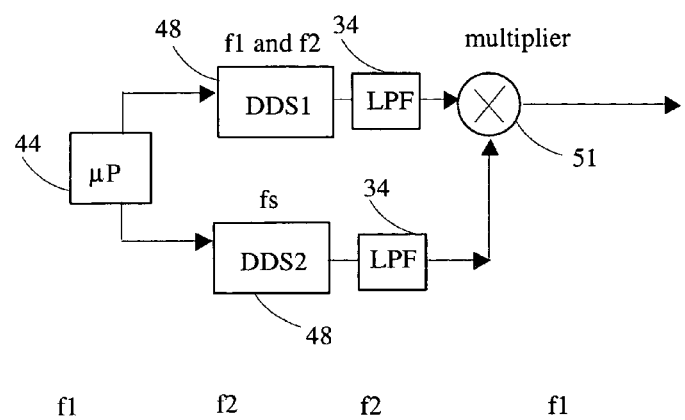
FIG. 8 illustrates a hardware windowing implementation.
Figure 9A:
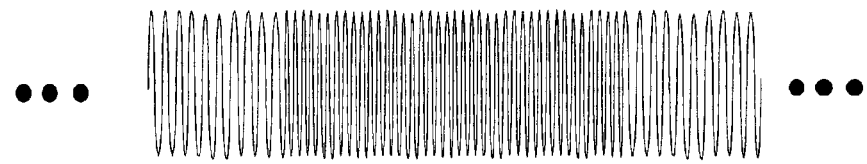
FIG. 9A shows dither tones generated by DDS1 of FIG. 8.
Figure 9B:
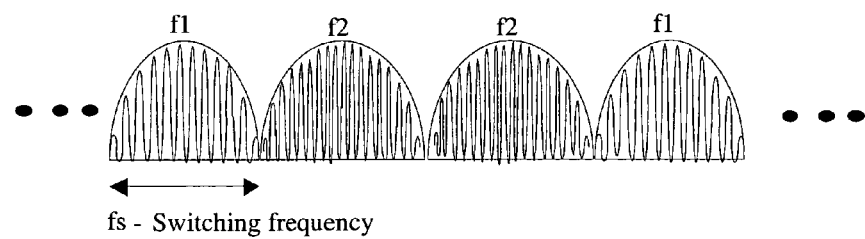
FIG. 9B shows dither tones with a hardware windowing technique being applied.

In one more modification to the embodiments of the invention, the encoding of dither tones onto the optical channel is performed by using a dither tone generator and modulating arrangement having two DDSs, where a technique of "hardware windowing" has been implemented. Means for performing hardware windowing is illustrated in FIG. 8. It includes the microprocessor μP 44, which provides control of DDS1 and DDS2 (designated as 48), the DDS1 and DDS2 being further connected to a multiplier 51 via corresponding LPFs 34. DDS1 is to generate two alternate dither tones having frequencies f1 and f2 respectively as illustrated in FIG. 9A. For example, f1 and f2 may be chosen as f1=50 000 Hz and f2=50 010 Hz. DDS2 is to generate a very slow frequency tone fs (e.g., 0.25 Hz), which is mixed with the f1 and f2 tones from DDS1 to result in the dither tone profile shown in FIG. 9B. The μP 44 controls the switching between frequencies f1 and f2 in such a manner that the frequency switching occurs right at the minimum point of tone fs, i.e., when its amplitude is minimal and close to zero (see FIG. 9B). As a result, the requirement for the phase continuity between f1 and f2 tones may be substantially reduced or eliminated. Because the frequency switching takes place when the amplitude of the dither signal is close to zero, the phase shift (if there is any) does not contribute to the leakage at DSP between different FFT bins, and thus, performance of the modulating arrangement is substantially improved.

Although embodiments of the invention have been described with the use of Fast Fourier Transform (FFT), it is contemplated that other known types of discrete transforms can also be used in the step of detecting and processing dither tones. Examples of such transforms are Discrete Cosine Transform (CDCT), Discrete Sinus Transform (DST), Inverse Discrete Cosine Transform (IDCT), Inverse Discrete Sinus Transform (IDST), Fast Walsh Transform (FWT), Fast Hadamard Transform (FHT).

Figure 4B:
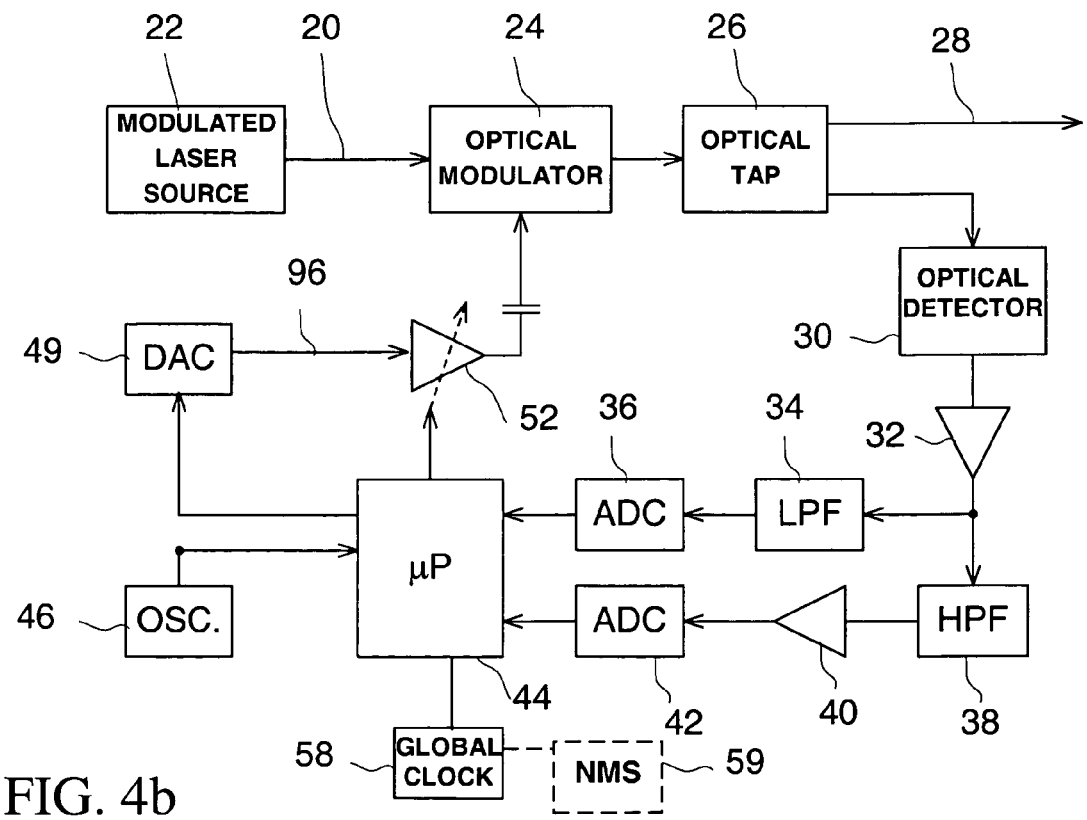
FIG. 4b illustrates another form of dither tone generator and modulating arrangement in accordance with another embodiment of the invention.

Although embodiments of the invention have been described with the use of DDSs to generate dither tones, it can be appreciated that the waveform synthesis can be accomplished through other ways. For example, in other implementations waveform synthesis is accomplished through pre-computation of complex waveform tables that are sent to a Digital to Analog Converter (DAC) for optical modulation, as opposed to the use of DDS chips with an analog switch. An example implementation is depicted in FIG. 4b. However, before describing how waveform synthesis can be accomplished using a DAC further details of waveform synthesis using DDSs will now be discussed in further details with reference to FIG. 4a.

To generate a dither signal having cyclically repeating tones of frequencies of f1=10 kHz and f2=10.050 kHz and having a periodicity of 2 seconds for example, one of the DDSs 48 is programmed to output a signal 90 at f1=10 kHz and the other DDS 48 is programmed to output another signal 92 at f2=10.050 kHz. In particular, each DDS 48 has registers (not shown), which store respective ones of the frequencies f1 and f2. The selector 50 switches between the signals 90, 92 every 2 seconds to produce a combined signal 94 with alternating frequencies f1 and f2.

In FIG. 4b, shown is another form of dither tone generator and modulating arrangement in accordance with another embodiment of the invention. The dither tone generator and modulating arrangement is similar to that of FIG. 4a except that the DDSs 48 and the selector 50 are replaced with a DAC 49. For example, to generate a dither signal having cyclically repeating dither tones of frequencies of $f_1=10$ kHz and $f_2=10.050$ kHz with a periodicity of 2 seconds, the μP 44 computes a DAC output value based on the following equation: DAC output value=S(t) sin (2*pi*10 kHz*t)+(1−S(t)) sin(2*pi*10.050 kHz*t), where S(t) is a time-dependent function with a value of either 0 or 1. In this particular example the time-dependent function alternates between 0 and 1 with a periodicity of 2 seconds. Computed DAC output values are then sent as digital data to the DAC 49 to generate a signal 96 having cyclically repeating dither tones of frequencies of f1=10 kHz and f2=10.050 kHz with a periodicity of 2 seconds.

Examples have been described in which a cyclically repeated sequence of two continuous dither tones is used to obtain a modulating signal for optical modulation. For example, with reference to FIG. 6a a cyclically repeated sequence of two dither tones of frequencies f1 and f2 is used. This sequence can be described by the sequence of frequencies f1, f2, . . . , f1, f2, . . . . In other implementations, other cyclic repeated sequences are used. For example, as discussed above in some implementations three dither tones with frequencies f1, f2, and f3 form a cyclic repeated sequence which is used for modulating an optical channel. Such an sequence can be described by the sequence of frequencies f1, f2, f3, . . . , f1, f2, f3, . . . , for example. More generally, two or more dither tones form a cyclic repeated sequence. Furthermore, in some implementations a particular tone is used more than once within the repeated sequence. For example, in one implementation three dither tones with frequencies f1, f2, and f3 form a cyclic repeated sequence used for modulating an optical channel, and the tone with frequency f2 is used twice in the sequence. An example of such implementation can be described by the sequence of frequencies f1, f1, f2, f3, . . . , f1, f1, f2, f3, . . . , for example. More generally, in some implementations one or more dither tones are used more than once within a sequence.

Figure 4C:
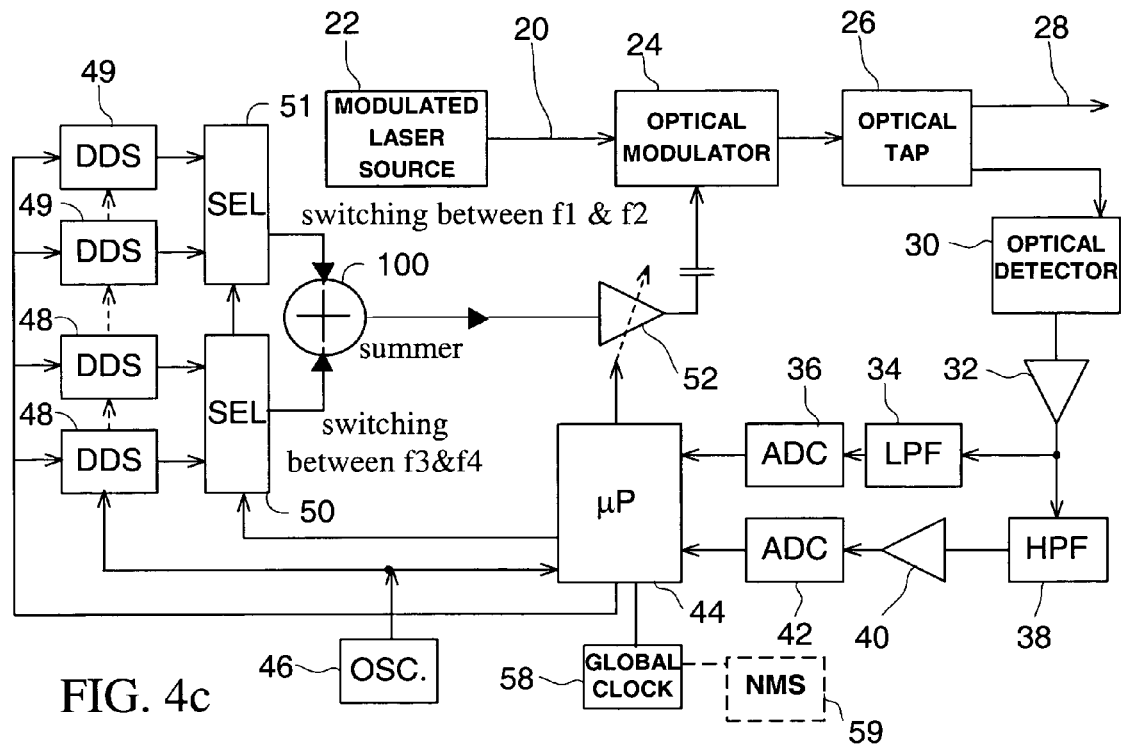
FIG. 4c illustrates another form of dither tone generator and modulating arrangement in accordance with another embodiment of the invention.

Example implementations have been described with reference to repeated sequences wherein at any instant in time an optical channel is modulated with only one dither tone that is used for channel identification. For example, with reference to FIG. 6a although a sequence of two dither tones with frequencies f1 and f2 is used for modulation, at any instant in time only one of the two dither signals is used to modulate an optical channel. In some implementations two or more dither signals are combined simultaneously and are used for channel identification. An example implementation will now be described with reference to FIG. 4c. FIG. 4c illustrates another form of dither tone generator and modulating arrangement in accordance with another embodiment of the invention. The arrangement of FIG. 4c is similar to that of FIG. 4a except that the arrangement in FIG. 4c also has DDSs 49, a selector 51, and a summer 100.

The DDSs 49 produce dither tones with frequencies f1 and f2. The selector 51 receives the dither tones from the DDSs 49 and alternately selects one of the dither tones in accordance with a pre-determined periodicity for transmission to the summer 100. The DDSs 48 produce dither tones with frequencies f3 and f4. The selector 50 receives the dither tones from the DDSs 48 and alternately selects one of the dither tones in accordance with the pre-determined periodicity for transmission to the summer 100. At one interval in time the summer 100 receives the dither tones of frequencies f1 and f3 and combines these dither tones to produce a composite signal for modulating the optical channel. At another interval in time the summer 100 receives the dither tones of frequencies f2 and f4 and combines these dither tones to produce a composite signal for modulating the optical channel. This process is repeated according to the predetermined periodicity resulting a combined signal with frequencies alternating between (f1, f3) and (f2, f4), which is used to produce a modulated optical channel in optical path 28. At a particular interval in time the resulting modulated optical channel in the optical path 28 is modulated with a set of two dither signals of either frequencies (f1, f3) or (f2, f4). The detection of such a modulated optical channel will now be described with reference to FIG. 5.

In FIG. 5 the modulated optical channel is received on the path 60 and processed as discussed above. In particular, the microprocessor 78 performs a sequence of frequency analysis operations, such as FFT processing of digital signals provided by the ADC 74 for example. However, for each operation within the sequence two dither signals may be detected depending on the intensity of the optical channel, payload noise level, and interference tones. For example, for a particular window in time one or more of the dither signals of frequencies f1, f3 is detected, whereas for another window in time one or more of the dither signals of frequencies f2, f4 is detected. In some implementations the optical channel is identified when one or more dither tones from each set of dither tones is detected. In particular, in this example the channel is modulated with a cyclically repeated sequence of combined dither tones with frequencies (f1, f3), (f2, f4), . . . , (f1, f3), (f2, f4), . . . . However, the optical channel may be too weak for detection of all of the tones. For example, if the dither tone of frequency f1 is not detected during a collision of an interference tone, the following cyclically repeated sequence will be detected (f3), (f2, f4), . . . , (f3), (f2, f4), . . . . In the example implementation, the channel is identified when such a sequence is detected. Table I lists the cyclically repeated sequences of dither tones, which are used to identify a channel modulated with the cyclically repeated sequence (f1, f3), (f2, f4), . . . , (f1, f3), (f2, f4), . . . .

TABLE I

List of Cyclically Repeated Sequences used to detect a channel.

| Sequence Number | Cyclically Repeated Sequence Detected |
|---|---|
| 1 | (f1, f3), (f2, f4), . . . , (f1, f3), (f2, f4), . . . |
| 2 | (f1), (f2, f4), . . . , (f1), (f2, f4), . . . |
| 3 | (f3), (f2, f4), . . . , (f3), (f2, f4), . . . |
| 4 | (f1, f3), (f4), . . . , (f1, f3), (f4), . . . |
| 5 | (f1, f3), (f2), . . . , (f1, f3), (f2), . . . |
| 6 | (f1), (f2), . . . , (f1), (f2), . . . |
| 7 | (f3), (f4), . . . , (f3), (f4), . . . |
| 8 | (f1), (f4), . . . , (f1), (f4), . . . |
| 9 | (f3), (f2), . . . , (f3), (f2), . . . |

In Table I, for Sequence 1 all of the dither tones are detected. For Sequences 2 to 5 only one of the dither tones from one of the sets of dither tones is detected, and for Sequences 6 to 9 only one of the two dither tones detected in each set. In the example, the channel is identified when any one of Sequences 1 to 9 is detected. This has the advantage that an optical channel is still identified even if one or more of the dither tones is not detected, thereby providing a robust detection method. In other implementations the optical channel is identified only when both dither tones from a particular set of dither tones are detected. In the above implementations, dither tones are distinguished from interference tones. For example, the detection of the switching of dither tones of frequencies f1 and f2, for example, at every 2 seconds over a period of time provides very conclusive information that the detected dither tones are indeed dither tones rather than payload interference tones. This way, in additions to mitigating problems with false negative detection where a channel is present but is missed, problems with false positive detection where a channel is not present but is falsely detected are also mitigated.

In the above example, the cyclic repeated sequence of dither tones has two sets of dither tones. However, it is to be clearly understood that other implementations are possible. More generally, each set in the sequence has one or more dither tones, and a channel is identified when one or more dither tones from each set is detected. For this purpose, it is to be clearly understood that in some embodiments of the invention the arrangement of FIG. 4c has one or more DDSs, none or more selectors, and one or more summers. In yet other embodiments of the invention, one or more DACs are used to produce combined dither signals.

In the above example, each set of dither signals within a cyclic repeated sequence of dither tones has two dither tones. One of the sets has dither signals of frequencies f1, f3 and the other set has dither tones of frequencies f2, f4. In some implementations, the number of dither tones varies from set to set within the sequence. For example, in some implementations a cyclic repeated sequence of dither tones has a set of 3 dither tones of frequencies f1, f2, f3 combined simultaneously to modulate an optical channel within an interval time and another set of 2 dither tones of frequencies f4, f5 combined simultaneously to modulate the optical channel within another interval time.

Embodiments of the invention have been described in which a combination of two or more dither tones are used for marking and detecting an optical channel. However, it is to be clearly understood that embodiments of the invention are not limited to using dither tones for purposes of optical channel detection. In some embodiments of the invention dither tones are also used in signal detection for detecting other network parameters such as links or fiber sections carrying the optical channel, an optical band including the channel, a source node in the network where the channel is marked, a destination node in the network where the channel is detected, an optical fiber carrying the channel, and bundle of fibers over which the optical channel is carried, for example.

For example, in an example implementation a first cyclically repeated sequence of dither tones with frequencies f1, f2 is used to identify an optical channel and a second cyclically repeated sequence of dither tones with frequencies f3, f4 is used to identify an optical fiber over which the optical channel is being transmitted. In some implementations the sequences are modulated simultaneously. This is illustrated in Table II where the sequences of dither tones are shown modulated simultaneously within each time interval $t_i$, where i=1, 2, 3, . . .

| Network | Time Interval | | | | |
|---|---|---|---|---|---|
| Parameter | $t_1$ | $t_2$ | $t_3$ | $t_4$ | $t_5$ |
| Channel ID | f1 | f2 | f1 | f2 | f1 |
| Fiber ID | f3 | f4 | f3 | f4 | f3 |

Table II: List of cyclically repeated sequences of dither tones used to detect a channel and a fiber, the cyclically repeated sequences being modulated simultaneously.

In Table II, the cyclically repeated sequences of dither tones are modulated simultaneously. In particular, within a time interval $t_i$ either the dither tones of frequencies f1 and f3 or the dither tones of frequencies f2 and f4 are modulated simultaneously.

In other implementations the dither tones from the first and second cyclically repeated sequences of dither tones are modulated sequentially. For example, in Table III the dither tones of frequencies f1, f2, which are used for channel detection, are modulated at time intervals $t_1$, $t_2$, $t_5$, $t_6$, . . . . On the other hand, the dither tones of frequencies f3, f4, which are used for fiber identification, are modulated at time intervals $t_3$, $t_4$, $t_7$, $t_8$, . . . .

TABLE III

List of cyclically repeated sequences of dither tones used to detect a channel and a fiber, the cyclically repeated sequences being modulated sequentially.
Time Intervals and Network Parameters

| Channel ID $t_1$ | Channel ID $t_2$ | Fiber ID $t_3$ | Fiber ID $t_4$ | Channel ID $t_5$ | Channel ID $t_6$ | Fiber ID $t_7$ | Fiber ID $t_8$ |
|---|---|---|---|---|---|---|---|
| f1 | f2 | f3 | f4 | f1 | f2 | f3 | f4 |

The above examples make use of two cyclically repeated sequences of dither tones for channel and fiber identification. However, in other implementations more than two cyclically repeated sequences of dither tones are modulated on an optical channel, and each sequence is used in signal detection to detect any suitable network parameter. Furthermore, the cyclically repeated sequences of dither tones are modulated simultaneously, sequentially, or using any suitable combination simultaneous and sequential modulation. For example, in yet another implementation at each time interval one or more dither tones is modulated and used for identifying a respective network parameter. Such an implementation will now be described with reference to Table IV.

TABLE IV

List of cyclically repeated sequences of dither tones used to detect a channel and a fiber.
Time Intervals and Network Parameters

| Channel ID $t_1$ | Fiber ID $t_2$ | Channel ID $t_3$ | Fiber ID $t_4$ | Channel ID $t_5$ | Fiber ID $t_6$ | Channel ID $t_7$ | Fiber ID $t_8$ |
|---|---|---|---|---|---|---|---|
| f1, f2 | f3, f4 | f1, f2 | f3, f4 | f1, f2 | f3, f4 | f1, f2 | f3, f4 |

In Table IV the dither tones of frequencies f1, f2, which are used for channel detection, are modulated at time intervals $t_1$, $t_3$, $t_5$, $t_7$, . . . . On the other hand, the dither tones of frequencies f3, f4, which are used for fiber identification, are modulated at time intervals $t_2$, $t_4$, $t_6$, $t_8$, . . . . In this example implementation, at each time interval two dither signals are used to identify a respective network parameter. More generally, at each time interval for each of one or more network parameters one or more dither signals are modulated.

Although the description above relates to an optical WDM network in which optical channels are identified by having their intensity modulated with a combination of a plurality of dither tones, it can be appreciated that similar principles can be applied to identifying and detecting multiple channels in networks and systems using other types of communications media and modulation methods. Other modulating techniques include amplitude modulation, frequency modulation, phase modulation, and polarization modulation for example.

Thus although particular embodiments of the invention are described above, it can be appreciated that these and numerous other modifications, variations, and adaptations may be made without departing from the scope of the invention as defined in the claims.

The invention claimed is:

1. A method of identifying a signal in an optical communications network comprising the steps of:
    (a) modulating an optical signal with a cyclically repeated sequence of low frequency dither tones, the cyclically repeated sequence having a predetermined periodicity;
    (b) performing a sequence of discrete transform operations on the optical signal to produce respective frequency analysis results; and
    (c) performing coherent averaging of the frequency analysis results over the discrete transform operations to detect the low frequency dither tones.

2. The method according to claim 1, wherein the step of modulating comprises allocating one or more dither tones for identifying a network parameter of the optical communications network.

3. The method according to claim 2, wherein the network parameter is identified by two or more low frequency dither tones modulated simultaneously, the method further comprising identifying network parameter by detecting at least one of the low frequency dither tones modulated simultaneously.

4. A method according to claim 1, wherein the optical signal is modulated with at least one other cyclically repeated sequence of low frequency dither tones, the other cyclically repeated sequence having a respective predetermined periodicity, the method further comprising:
    for each other cyclically repeated sequence of low frequency dither tones:
        detecting the low frequency dither tones by coherently averaging the respective frequency analysis results produced by the discrete transform operations, and
        identifying a respective network parameter from the detected low frequency dither tones.

5. A method according to claim 4 wherein each cyclically repeated sequence of low frequency dither tones uniquely identifies said respective network parameter.

6. A method according to claim 4 wherein each network parameter comprises one of a channel ID (IDentifier), a link ID, an optical fiber ID, a fiber section ID, an optical band ID, a source node ID, a destination node ID, and a bundle ID.

7. A method according to claim 4, wherein the cyclically repeated sequences of low frequency dither tones are modulated in one of the following ways: (a) simultaneously; (b) consecutively; and (c) using a combination of (a) and (b).

8. A method according to claim 1, wherein each low frequency dither tone in the cyclically repeated sequence of low frequency dither tones is repeated with substantially the same phase at said predetermined periodicity.

9. A method according to claim 1, wherein at least one of the low frequency dither tones is modulated at least twice within the sequence.

10. A method according to claim 1, wherein the cyclically repeated sequence of low frequency dither tones comprises a plurality of sets of at least one low frequency dither tone modulated simultaneously, at least two of the plurality of sets having different numbers of low frequency dither tones.

11. A detection arrangement for an optical communications network comprising:
    a detector for detecting an optical signal modulated with a cyclically repeated sequence of low frequency dither tones, the cyclically repeated sequence having a predetermined periodicity; and
    a processor for performing a sequence of discrete transform operations on the optical signal to produce respective frequency analysis results and for coherently averaging the frequency analysis results over the discrete transform operations to detect the low frequency dither tones.

12. An arrangement according to claim 11 wherein the processor comprises means for identifying a network parameter from the detection of the low frequency dither tones.

13. An arrangement according to claim 12 wherein each network parameter comprises one of a channel ID (IDentifier), a link ID, an optical fiber ID, a fiber section ID, an optical band ID, a source node ID, a destination node ID, and a bundle ID.

14. An arrangement according to claim 11 wherein the cyclically repeated sequence of low frequency dither tones comprises at least one set of low frequency dither tones modulated simultaneously, the processor comprising means for identifying a network parameter by detecting at least one of the low frequency dither tones modulated simultaneously from each set.

15. An arrangement according to claim 11 wherein the optical signal is modulated with at least one other cyclically repeated sequence of low frequency dither tones, said at least one other cyclically repeated sequence having a respective predetermined periodicity, processor comprising:
    means for coherently averaging the frequency analysis results over the discrete transform operations to detect the low frequency dither tones for each said at least one other cyclically repeated sequence; and
    means for identifying a respective network parameter from the detected low frequency dither tones.

16. An arrangement according to claim 15 wherein each cyclically repeated sequence of low frequency dither tones uniquely identifies said respective network parameter.

17. An arrangement according to claim 15, wherein the cyclically repeated sequences of low frequency dither tones are modulated in one of the following ways: (a) simultaneously; (b) consecutively; and (c) using a combination of (a) and (b).

18. An arrangement according to claim 11 wherein each low frequency dither tone in the cyclically repeated sequence of low frequency dither tones is repeated with substantially the same phase at said predetermined periodicity.

19. The combination according to claim 18, wherein the modulating arrangement comprises means for producing at least one other cyclically repeated sequence of low frequency dither tones, the sequence having a predetermined periodicity, the modulator comprising means for modulating the optical signal with the at least one other cyclically repeated sequence of low frequency dither tones.

20. The combination according to claim 18, wherein the means for producing a cyclically repeated sequence of low frequency dither tones comprises at least one programmable frequency source for generating the low frequency dither tones.

21. The combination according to claim 18, wherein the means for producing a cyclically repeated sequence of low frequency dither tones comprises at least two programmable frequency sources for generating the low frequency dither tones and at least one selector for alternately selecting the low frequency dither tones.

22. The combination according to claim 18, wherein the means for producing a cyclically repeated sequence of low frequency dither tones comprises a DAC (Digital to Analog Converter) for generating the low frequency dither tones.

23. In combination, a detection arrangement of claim 11, and a modulating arrangement for modulating an optical signal, the modulating arrangement comprising:
   means for producing a cyclically repeated sequence of low frequency dither tones, the sequence having a predetermined periodicity; and
   a modulator for modulating the optical signal with the cyclically repeated sequence of low frequency dither tones.

24. The combination according to claim 23, wherein the cyclically repeated sequence of low frequency dither tones comprises at least one set of low frequency dither tones modulated simultaneously.

25. An optical system, comprising:
   a modulating arrangement for generating a cyclically repeated sequence of low frequency dither tones, the sequence having a predetermined periodicity, and for modulating an optical signal with the cyclically repeated sequence of low frequency dither tones; and
   a detection arrangement for:
      detecting the optical signal;
      performing a sequence of discrete transform operations on the optical signal to produce respective frequency analysis results; and
      detecting the low frequency dither tones by coherently averaging the frequency analysis results over the discrete transform operations.

26. The system according to claim 25, comprising a global clock for synchronizing time intervals for modulating the optical signal with the low frequency dithers tones at the modulating arrangements and time intervals for detecting the low frequency dither tones at the detection arrangement.

27. The system according to claim 26, wherein the time intervals of modulating and detecting respective dither tones have same duration and start at an instant of switching dither tone frequencies.

* * * * *

UNITED STATES PATENT AND TRADEMARK OFFICE
CERTIFICATE OF CORRECTION

| | | |
|---|---|---|
| PATENT NO. | : 7,551,858 B2 | Page 1 of 1 |
| APPLICATION NO. | : 11/511248 | |
| DATED | : June 23, 2009 | |
| INVENTOR(S) | : Ping Wai Wan et al. | |

It is certified that error appears in the above-identified patent and that said Letters Patent is hereby corrected as shown below:

Column 17, line 29, after "identifying" and before "network" insert -- the --.

Column 18, line 50, cancel the text beginning with "19. The combination according to claim" to and ending "the low frequency dither tones." in column 19, line 04.

Column 19, line 05, the claim reference numeral "23" is corrected to read as -- 19 --.

Column 19, line 14, the claim reference numeral "24" is corrected to read as -- 20 --.

Column 19, line 14, "to claim 23" is corrected to read as -- to claim 19 --.

Column 19, line 17, after the text ending with "dither tones modulated simultaneously", insert the following claims:

-- 21. The combination according to claim 19, wherein the modulating arrangement comprises means for producing at least one other cyclically repeated sequence of low frequency dither tones, the sequence having a predetermined periodicity, the modulator comprising means for modulating the optical signal with the at least one other cyclically repeated sequence of low frequency dither tones.
22. The combination according to claim 19, wherein the means for producing a cyclically repeated sequence of low frequency dither tones comprises at least one programmable frequency source for generating the low frequency dither tones.
23. The combination according to claim 19, wherein the means for producing a cyclically repeated sequence of low frequency dither tones comprises at least two programmable frequency sources for generating the low frequency dither tones and at least one selector for alternately selecting the low frequency dither tones.
24. The combination according to claim 18, wherein the means for producing a cyclically repeated sequence of low frequency dither tones comprises a DAC (Digital to Analog Converter) for generating the low frequency dither tones. --.

Signed and Sealed this
Seventh Day of June, 2011

David J. Kappos
*Director of the United States Patent and Trademark Office*